United States Patent [19]
Wilson et al.

[11] 4,174,502
[45] Nov. 13, 1979

[54] DELTA MODULATED DIGITAL SIGNAL DETECTOR

[75] Inventors: Alan L. Wilson, Schaumburg; Charles A. Backof, Jr., Hoffman Estates, both of Ill.

[73] Assignee: Motorola, Inc., Schaumburg, Ill.

[21] Appl. No.: 951,895

[22] Filed: Oct. 16, 1978

[51] Int. Cl.² ............................................. H03K 9/00
[52] U.S. Cl. .................................. 329/104; 325/38 B; 325/304; 325/321
[58] Field of Search ................ 329/104; 325/325, 321, 325/323, 324, 473, 474, 304, 38 B; 179/1.5 E

[56] References Cited
U.S. PATENT DOCUMENTS

| | | |
|---|---|---|
| 3,852,671 | 12/1974 | Risley ..................................... 325/492 |
| 3,902,123 | 8/1975 | Oomen ............................. 325/474 X |
| 3,925,732 | 12/1975 | Tanaka et al. ................... 329/104 X |
| 4,087,753 | 5/1978 | Paul ................................. 325/325 X |

OTHER PUBLICATIONS

B. G. Taylor, "Signal Detection of Delta–Coded Speech", Proceedings of the IEE, vol. 123, No. 8, Aug. 1976, pp. 752-755.

Primary Examiner—Siegfried H. Grimm
Assistant Examiner—Edward P. Westin
Attorney, Agent, or Firm—Rolland R. Hackbart; James W. Gillman

[57] ABSTRACT

A detector for delta modulated digital signals is disclosed that provides a signal quality voltage having a magnitude that is indicative of the degree of quality of the detected delta modulated digital signal. The detector totalizes the number of bit transitions occurring in successive N bit intervals. If successive totalized numbers of bit transitions are outside of a predetermined range centered about one-half of N, the detector provides a detect indication signal indicating that the delta modulated digital signal is present. Otherwise, a random or pseudorandom signal such as noise or error bursts may be present. Digital circuitry provides the detect indication signal with a logical high state when successive totalized numbers of bit transitions are outside of the predetermined range, and a logical low state when succesive totalized numbers of bit transitions are within the predetermined range. The detect indication signal may be further integrated and amplified to provide a signal quality voltage which has a magnitude indicative of the quality or signal to noise ratio of the detected delta modulated digital signal. The signal quality voltage may be advantageously utilized in a receiver voting system having a plurality of receivers for selecting the receiver having the highest quality signal.

16 Claims, 3 Drawing Figures ns
DELTA MODULATED DIGITAL SIGNAL DETECTOR

TECHNICAL FIELD

The present invention relates to digital signal detectors, and more particularly, to an improved detector for delta modulated digital signals.

BACKGROUND ART

A prior art technique for detecting the presence of a delta modulated digital signal is described in co-pending application Ser. No. 830,256, entitled "A Delta Modulation Detector", by Paul H. Horn, filed on Sept. 2, 1977 and assigned to the instant assignee. According to this technique, the statistical characteristics of a delta modulated digital signal are utilized to make a one time determination as to the presence of the digital signal. The delta modulated signal is determined to be present if over a predetermined time interval, the number of bit transitions of the delta modulated digital signal is greater than a predetermined high number or less than a predetermined low number. However, this technique is insensitive to error bursts, has a slow response time and does not provide a continuous monitor of the presence of the delta modulated digital signal.

SUMMARY OF THE INVENTION

It is an object of the present invention to provide an improved detector for delta modulated digital signals that provides an indication of the presence of the delta modulated digital signal in a substantially continuous manner.

It is another object of the present invention to provide an improved detector for delta modulated digital signals that reliably discriminates between the delta modulated digital signal and voice, noise, and other random or pseudorandom signals.

It is a further object of the present invention to provide an improved detector for delta modulated digital signals that detects error bursts introduced in the delta modulated digital signal during transmission.

It is yet a further object of the present invention to provide an improved detector for delta modulated digital signals that provides a measure of the quality of the delta modulated digital signal.

In practicing the present invention, a detector provides a detect indication signal when detecting the presence of a delta modulated digital signal. The delta modulated digital signal is transmitted in a serial bit stream at a predetermined bit frequency by a clock signal. A first counter is responsive to the clock signal for providing a reset pulse signal at the end of each successive N bit interval. The N bit interval may be, for example, 16 bits long. During such a 16-bit interval, there may be a maximum of 16 bit transitions or changes in logical state of the digital signal and a minimum of zero bit transitions. A transition detector is responsive to the digital signal and clock signal for providing a transition pulse signal for each such change in logical state of the digital signal.

A second counter totallizes the transition pulse signals occurring between successive reset pulse signals. Thus, at the end of each N bit interval, the second counter provides a totallized count of the bit transition occurring within that interval. Storage circuitry having at least two stages repetitively stores the totallized counts for at least the previous two N bit intervals. Gating circuitry coupled to the storage circuitry provides a detect indication signal when both of the stored totallized counts have a magnitude that is outside of a predetermined range of magnitudes centered about one-half of N. The detect indication signal may be further integrated by integrating circuitry to provide a quality signal having a magnitude proportional to the bit error rate of the digital signal.

DETAILED DESCRIPTION OF THE INVENTION

Figure 1:
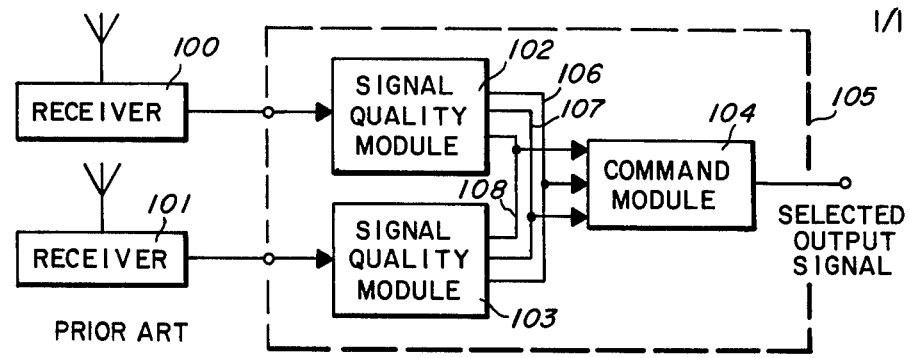
FIG. 1 is a block diagram of a receiver voting system in which the present invention may be advantageously utilized.

In FIG. 1, there is illustrated a receiver voting system which may advantageously utilize the present invention to select from a plurality of receivers, the receiver which is receiving a delta modulated digital signal with the highest degree of signal quality. Such a receiver voting system is described in detail in U.S. Pat. No. 4,013,962. In the receiver voting system of FIG. 1, a plurality of receivers 100 and 101 operating on the same RF frequency are located throughout a geographical coverage area. A comparator 105 compares the signals from each of the receivers 100 and 101 and selects the signal that has the best quality, the process of selection generally designated "voting". The selected signal is provided at the output of the comparator 105.

The comparator 105 includes a signal quality module 102 and 103 for each receiver 100 and 101 and a command module 104. A detailed description of the signal quality module 102 and 103 and the command module 104 is provided in Motorola instruction manual, 68P1026E40, entitled "SPECTRA TAC Total Area Coverage Comparator", published by Motorola Service Publications Department, Motorola, Inc., 1976.

The receivers 100 and 101 may receive signals that contain either clear (i.e. conventional) audio signals or audio signals digitally coded according to delta modulation. Thus, the signal quality modules 102 and 103 must have the capability of providing an indication of the signal quality of both clear and coded audio signals. The signal quality of clear audio signals can be determined in a number of ways, such as those described in U.S. Pat. Nos. 3,984,776, 4,028,627, 4,034,299 and 4,052,678. Thus, each signal quality module includes circuitry of the type described in the foregoing patents for providing a clear signal quality voltage. The clear signal quality voltage is applied to the clear signal quality voltage bus 106.

However, the foregoing circuitry for determining the signal quality for clear audio signals is unsatisfactory for coded audio signals. Additional circuitry may be included in the signal quality modules 102 and 103 for accommodating coded audio signals. First, circuitry may be included that differentiates clear audio from a digital bit stream. This circuitry may be a digital signal detector similar to that described in U.S. Pat. No. 3,995,225 or in copending U.S. patent application, Ser. No. 951,896, entitled "Digital Signal Detector", by Terrence E. Sumner et al, filed on the same date as, and assigned to the same assignee as, the instant application. The digital signal detector activates a control bus 107 to indicate to the command module 104 that a digital bit stream has been received.

Next, the signal quality modules 102 and 103 may include the delta modulated digital signal detector of the present invention, which provides a coded signal quality voltage for coded audio signals. The coded signal quality voltage is applied to the coded signal quality voltage bus 108. The voting process is continually performed for both clear and coded audio. When the command module 104 senses that the control bus is activated, the voted coded audio signal is coupled to the command-module output, otherwise the voted clear audio signal is coupled to the command-module output. Thus, the highest quality clear or coded audio signal is automatically provided at the command-module output.

Figure 2:
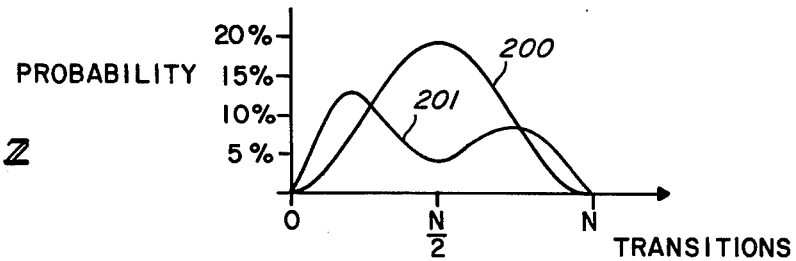
FIG. 2 is a waveform illustrating the probability of bit transitions occurring in an N bit interval for both a delta modulated digital signal and for noise.

The statistical properties of delta modulated signals may be utilized to discriminate between the delta modulated signal and other random or pseudorandom signals. In FIG. 2, there is illustrated the probability of the number of bit transitions occurring in an N bit interval for both a delta modulated signal 201 and for noise 200. For the delta modulated signal 201, the probability of having N/2 transitions in an N bit interval is relatively low, while for noise, the probability of having N/2 transitions in an N bit interval is relatively high. By taking advantage of the foregoing statistical property of delta modulated signals, a detector may readily discriminate between a delta modulated signal and other random or pseudorandom signals such as noise.

Furthermore, delta modulated digital signals may be scrambled according to selected codes, such as conventional convolution codes, in order to provide security from unwanted monitoring of the communication channel. Prior to transmission, the delta modulated digital signal may be scrambled according to a particular convolution code, and subsequently unscrambled when received by a receiver 100 or 101. However, if a single bit error is introduced during transmission of the scrambled delta modulated digital signal, a pseudorandom error burst is produced upon unscrambling in the receiver. For example, a single bit error introduced during transmission may result in an error burst disturbing as many as 32 bits. Such a 32 bit error burst will most probably contain 16 bit transitions. By taking advantage of the statistical characteristics of delta modulated digital signals described hereinabove and illustrated in FIG. 2, the detector of the present invention discriminates between a delta modulated digital signal and random or pseudorandom signals such as noise and error bursts.

Figure 3:
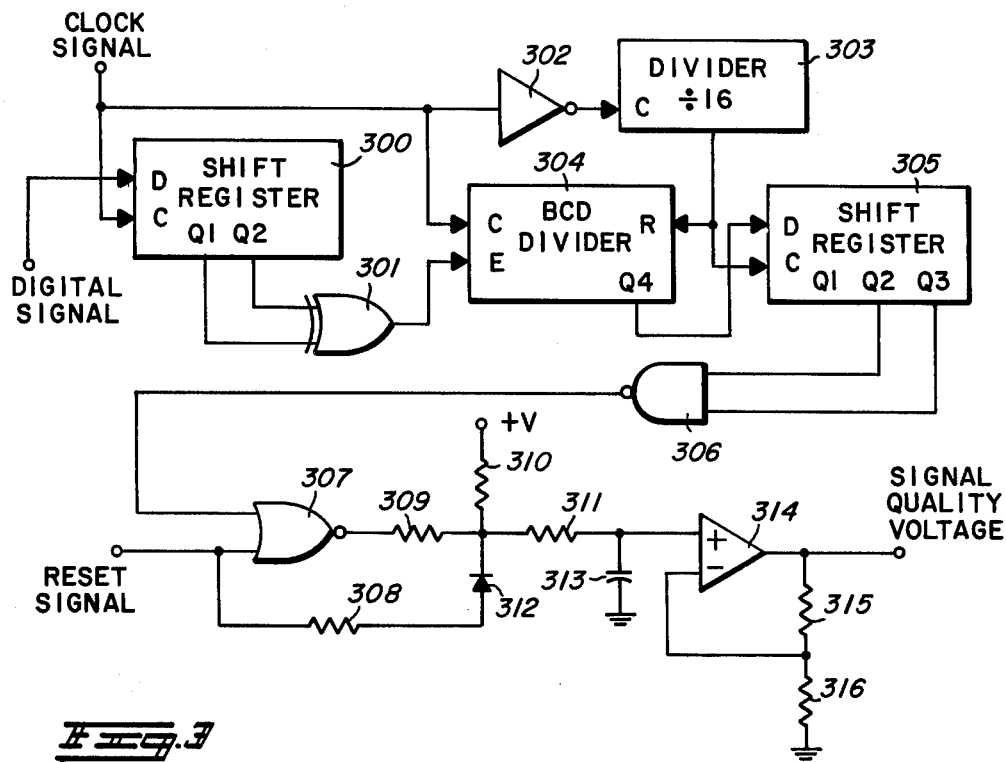
FIG. 3 is a detailed block diagram of an embodiment of the digital signal detector of the present invention.

In FIG. 3, there is illustrated an embodiment of the present invention that reliably discriminates between delta modulated digital signals and random or pseudorandom signals. For the preferred embodiment, N=16 and the predetermined range of magnitudes centered about N/2 includes 8 and 9, although any suitable value for N and corresponding predetermined range of magnitudes may be utilized depending on the particular application of the delta modulated digital signal detector. The detector totallizes the number of bit transitions in each 16 bit interval. If the totallized number of bit transitions is 8 or 9 for two consecutive 16-bit intervals, the detector recognizes the signal as noise or an error burst. If the totallized count for two successive intervals is within the range from zero to 7 or 10 to 16, the detector recognizes the signal as a delta modulated digital signal. The foregoing operation is repeated continuously over each 16-bit interval. Thus, if detecting a single error-burst, the detector provides a low going pulse at the output of NAND gate 306. When noise is present, the output of NAND gate 306 remains in a logic low state. Otherwise, when the proper delta modulated digital signal is present the output of NAND gate 306 will remain in a logic high state. Furthermore, by integrating the output of NAND gate 306, the detector may provide a signal quality voltage whose magnitude is indicative of the degree of quality, i.e. bit error rate, of the delta modulated digital signal.

In the preferred embodiment of FIG. 3, the delta modulated digital signal is a bit stream transmitted at 12,000 bits per second. The clock signal has a frequency of 12 KHz and is recovered from the bit stream by any suitable conventional means. For example, the clock signal may be recovered from the delta modulated digital signal by a conventional digital phase-locked loop.

A transition detector is formed by shift register 300 and EXCLUSIVE OR gate 301. The digital signal is serially clocked into stages Q1 and Q2 of the shift register 300 by the clock signal. When bit transitions occur in the digital signal, stages Q1 and Q2 of the shift register 300 will have opposite logical states. EXCLUSIVE OR gate 301 provides a logical high output signal when states Q1 and Q2 of the shift register 300 have opposite logical states.

The 16-bit interval is generated by divider 303 which provides a reset pulse signal after every 16 cycles of the clock signal. Inverter 302 inverts the clock signal to provide the proper polarity of the clock signal to the clock input of the divider 303.

The divider 304 totallizes the number of transitions in each 16 bit interval. The divider 304 is reset at the end of each 16 bit interval by the reset pulse signal from divider 303. The divider 304 increments its contents by one at each low to high transition of the clock signal, if enabled by a logic high from EXCLUSIVE OR gate 301. Divider 304 may be a conventional BCD divider having four stages. Thus, stage Q4 of a BCD divider 304 will provide a logic high signal when 8 or 9 bit transitions have been totallized. If more or less bit transitions occur in a 16-bit interval, stage Q4 will provide a logic low state.

Shift register 305 has three stages Q1, Q2 and Q3 and is enabled to serially receive Q4 of divider 304 by the reset pulse signal from divider 303. Thus, if 8 or 9 bit transitions occur in at least two successive 16-bit intervals, two successive logic high state bits, the states of Q4 of divider 304, will be shifted into stages Q1–Q3 of the shift register 305. When the two successive logic high bits are shifted into stages Q2 and Q3 of shift register 305, NAND gate 306 provides a logic low output. Otherwise, NAND gate 306 provides a logic high output. A logic high output from NAND gate 306 indicates that the delta modulated digital signal is present, while a logic low output indicates that a random or pseudorandom signal is present.

The output of NAND gate 306 is then applied via NOR gate 307 to an integrator formed by resistors 309–311 and capacitor 313. The NOR gate 307 is provided with an input for a reset signal so that capacitor 313 may be initialized to the fully charged state. A fast charge path is provided from the reset signal to the capacitor 313 via resistor 308, diode 312 and resistor 311. The reset signal is normally in the logic low state. When the digital signal detector is utilized in the aforementioned receiver voting system, the reset signal may be activated by detection of a tone which is transmitted by a receiver 100 or 101 to the comparator 105 when the respective receiver 100 or 101 is not receiving an RF signal.

The time constant of the integrator 309–313 may be set to accept a predetermined amount of signal degradation or bit error rate. For example, the integrator time constant may be selected to allow up to eight error bursts per second.

The voltage across capacitor 313 is further multiplied by amplifier circuitry 314–316 to provide a signal quality voltage having a magnitude ranging from approximately 2.5 volts to 12 volts. Amplifier 314 includes resistors 315 and 316 for setting the voltage at its negative input. The signal quality voltage from amplifier 314 will be near the lower limit or 2.5 volts for a signal of the highest quality, i.e. the lowest bit error rate. In the aforementioned receiver voting system, the signal quality voltage may be used within the signal quality modules 102 and 103 to select the receiver that has the best quality delta modulated digital signal. The details of the selecting or voting process are described in the aforementioned U.S. Pat. No. 4,013,962 and in the aforementioned Motorola Instruction Manual.

The delta modulated digital signal detector illustrated in FIG. 3 may be realized with conventional logic circuits and electrical circuit elements. The logic circuits may be any suitable logic circuits such as those described in, "The Semiconductor Data Library/C-MOS", Vol. 5, published by Motorola Semiconductor Products Inc., 1976. For example, the shift registers 300 and 305 may be MC14015's, the EXCLUSIVE OR gate 301 a MC14070, the inverting gate 302 a MC14049, the divider 303 a MC14569, the divider 304 a MC14518, the NAND gate 306 a MC14011, and the NOR gate 307 a MC14001. The amplifier 314 may be any suitable operational amplifier such as a Motorola MC1741. Furthermore, the delta modulated digital signal detector may be readily integrated onto an integrated circuit substrate using any suitable integration technique known in the art.

We claim:

1. A detector for delta modulated digital signals transmitted in a serial bit stream at a predetermined bit frequency of a clock signal, comprising:
   means for generating a clock signal;
   first counting means responsive to the clock signal for providing a reset pulse signal at the end of each successive N bit interval, where N is an integer;
   transition detection means responsive to the digital signal and the clock signal for providing a transition pulse signal for each change in logical state between successive bits of the digital signal;
   second counting means responsive to the transition pulse signals and reset pulse signals for repetitively providing totallized counts of the transition pulses occurring between successive reset pulse signals;
   means for storing at least the last two successive totallized counts; and
   means for providing a detect indication signal that the dititval signal is present when both of the stored totallized counts have a magnitude outside of a predetermined range of magnitudes centered about one-half of N.

2. The digital signal detector according to claim 1, further including means for integrating the detect indication signal to provide a quality signal having a magnitude proportional to the bit error rate of the digital signal.

3. The digital signal detector according to claim 2, for use in each of a plurality of receivers of a receiver voting system, wherein the receiver voting system includes comparator means responsive to the quality signals from the respective digital signal detectors in the receivers for selecting the receiver that is receiving the digital signal with the lowest bit error rate.

4. The digital signal detector according to claim 1, wherein the storing means includes means for storing the last M successive totallized counts, where M is an integer, and wherein the indication providing means provides a detect indication signal that the digital signal is present when a majority of the M stored totallized counts have magnitudes outside of the predetermined range of magnitudes.

5. The digital signal detector according to claim 1, wherein N is 16 and the predetermined range of magnitudes includes 8 and 9.

6. An error-burst detector for delta modulated digital signals transmitted in a serial bit stream at a predetermined bit frequency of a clock signal, the digital signals scrambled according to a predetermined coding scheme prior to transmission and unscrambled prior to application to the error-burst detector, a single bit error introduced during transmission of the digital signal causing a pseudorandom error burst when unscrambled, said error-burst detector comprising:
   means for generating a clock signal;
   first counting means responsive to the clock signal for providing a reset pulse signal at the end of successive N-bit intervals, where N is an integer;
   transition detection means responsive to the digital signal and the clock signal for providing a transition pulse signal for each change in logical state between successive bits of the digital signal;
   second counting means responsive to the transition pulse signals and reset pulse signals for repetitively providing totallized counts of the transition pulses occurring between successive reset pulse signals;
   means for storing at least the last two successive totallized counts; and
   means for providing an error-burst indication signal that an error burst is present when both of the stored totallized counts have a magnitude within a predetermined range of magnitudes centered about one-half of N.

7. The error-burst detector according to claim 6, further including means for integrating the error-burst indication signal to provide a quality signal having a magnitude proportional to the bit error rate of the digital signal.

8. The error-burst detector according to claim 7, for use in each of a plurality of receivers of a receiver voting system, wherein the receiver voting system includes comparator means responsive to the quality signals from the respective digital signal detectors in the receivers for selecting the receiver that is receiving the digital signal with the lowest bit error rate.

9. The digital signal detector according to claim 6, wherein N is 16 and the predetermined range of magnitudes includes 8 and 9.

10. A detector for delta modulated digital signals transmitted in a serial bit stream at a predetermined bit frequency of a clock signal, comprising:
    means for generating a clock signal;

a first N state counter responsive to the clock signal for providing a reset pulse signal at the end of successive N-bit intervals, where N is an integer;

a first shift register having at least first and second stages responsive to the clock signal for serially receiving and storing at least two successive bits of the digital signal;

exclusive OR gating circuitry coupled to the first and second stages of the first shift register for providing a transition pulse signal when bits stored in the first and second stages of the first shift register have different logical states;

a second counter responsive to the transition pulse signals and reset pulse signals for repetitively providing totallized counts of the transition pulse signals occurring between successive reset pulse signals;

first gating circuitry responsive to the totallized counts from the second counter for providing an output signal having a predetermined first logical state when the totallized count has a magnitude within a predetermined range of magnitudes centered about one-half of N, and a predetermined second logical state when the totallized count is outside of the predetermined range of magnitudes;

a second shift register having at least two stages responsive to the reset pulse signals for serially receiving and storing at least the last two successive output signals from the first gating circuitry; and second gating circuitry for combining the stored output signals from the second shift register to provide a detect indication signal that the digital signal is present when both of the stored output signals have a predetermined second logical state.

11. The digital signal detector according to claim 10, wherein the delta modulated digital signal is scrambled according to a predetermined code prior to transmission and unscrambled prior to application to the digital signal detector, single bit errors occurring during transmission causing in the unscrambled digital signal an error burst having a pseudorandom data pattern lasting essentially over 2 N bits.

12. The digital signal detector according to claim 11, further including means for integrating the detect indication signal to provide a quality signal having a magnitude proportional to the bit error rate of the digital signal.

13. The digital signal detector according to claim 12, wherein the predetermined coding scheme includes a predetermined binary convolution code.

14. The digital signal detector according to claim 13, for use in each of a plurality of receivers of a receiver voting system, wherein the receiver voting system includes comparator means responsive to the quality signals from the respective digital signal detectors in the receivers for selecting the receiver that is receiving the digital signal with the lowest bit error rate.

15. The digital signal detector according to claim 14, wherein N is 16 and the predetermined range of magnitudes includes 8 and 9.

16. The digital signal detector according to claim 10 or 12, further including a semiconductive substrate, said digital signal detector comprised of electrical circuit elements integrated into the semiconductive substrate.

* * * * *